H. STUEBNER.
ANTIFRICTION BEARING.
APPLICATION FILED SEPT. 1, 1909.

986,871.

Patented Mar. 14, 1911.

WITNESSES:

INVENTOR
Henry Stuebner
BY Charles N. Butler
ATTORNEY.

UNITED STATES PATENT OFFICE.

HENRY STUEBNER, OF PHILADELPHIA, PENNSYLVANIA.

ANTIFRICTION-BEARING.

986,871.

Specification of Letters Patent. Patented Mar. 14, 1911.

Application filed September 1, 1909. Serial No. 515,596.

*To all whom it may concern:*

Be it known that I, HENRY STUEBNER, a citizen of the United States, residing at Philadelphia, in the county of Philadelphia and State of Pennsylvania, have invented certain Improvements in Antifriction-Bearings, of which the following is a specification.

My invention is an anti-friction bearing having alternating rollers and balls arranged so that the balls space the rollers and hold them against endwise movement, the mechanism being designed for taking up any axial thrust as well as carrying the radial thrust or force.

Figure 1:
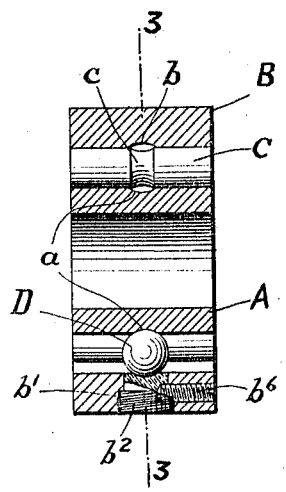
Figure 2:
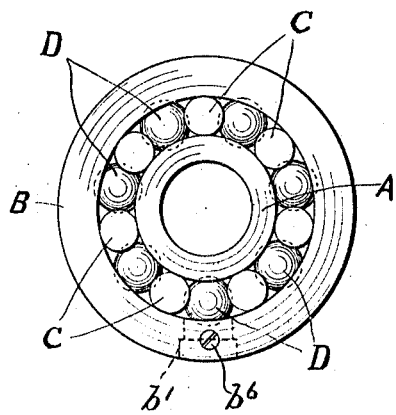
Figure 3:
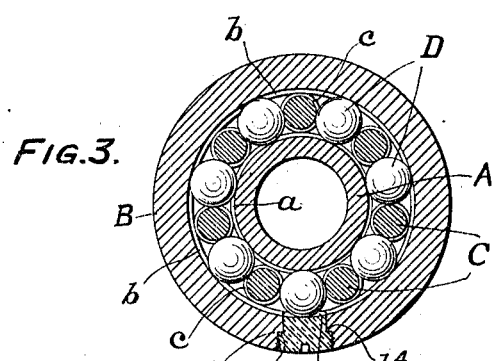
Figure 4:
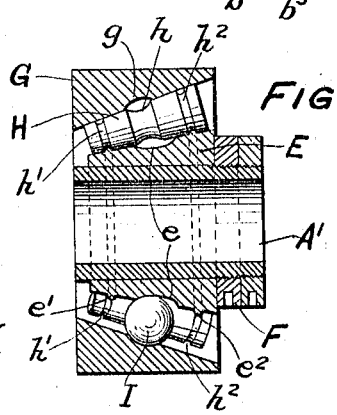

In the accompanying drawings, Figure 1 is a sectional view taken through the axis of a revoluble bearing having my improvements applied thereto; Fig. 2 is an end elevation of the same; Fig. 3 is a sectional view taken on the line 3—3 of Fig. 1; and Fig. 4 is a sectional view taken through the axis of a modified construction.

The mechanism embodying the invention, as illustrated in Figs. 1, 2, and 3 of the drawings, comprises a shaft or spindle A having the circular exterior raceway groove $a$, a box or case B having in its cylindrical interior the raceway groove $b$, the rollers C disposed between the shaft A and the box B and having the circular raceway grooves $c$ in the plane of the races $a$ and $b$, and the balls D which lie between the parts A and B alternate with the rollers C and are engaged in the raceway grooves $a$, $b$, and $c$.

The case B is provided with a threaded aperture $b^1$ through which the balls D are inserted, the aperture being closed by a plug $b^2$ having a raceway groove $b^3$ forming part of the race $b$. The aperture $b^1$ is provided with the shoulder $b^4$ which engages a shoulder $b^5$ of the plug $b^2$ when the raceway groove section $b^3$ has reached its proper position. A screw $b^6$ is passed into the box and the plug to secure the latter and its raceway groove section in position.

The raceway grooves of the rollers are so designed and the parts so proportioned that the rolling action of the balls is obtained by their contact with the rollers, the raceway grooves in the shaft being formed so as to permit the balls to play without contact therewith when the bearing is carrying a radial thrust.

As illustrated in Fig. 4, the shaft A' is provided with a conical bearing or collar E, adjustable along the shaft to take up play by means of the nut F, the bearing having the circular exterior raceway groove $e$ and the circular beads $e^1$ and $e^2$. The box or case G, which surrounds the collar E, has the circular raceway groove $g$ formed in its conical interior surface, which is inclined to and has greater pitch than the bearing surface of the collar. Conical rollers H, which lie between the collar E and the box G, have the circular raceway grooves $h$, which lie in line with the raceway grooves $e$ and $g$, and the circular races $h^1$ and $h^2$, which are engaged by the heads $e^1$ and $e^2$, the beads preventing the rollers from playing longitudinally. Balls I lie between the cone E and the box G, alternating with and spacing the rollers H, and registering with the raceway grooves $e$, $g$, and $h$. The balls are rolled by their engagements with the rollers and have free movement relative to the collar and case in carrying a radial load.

Having described my invention, I claim:

1. In an anti-friction bearing, the combination of an inner member having an exterior bearing surface with a raceway groove beneath said surface and an exterior member having an interior raceway groove, disposed between said members rollers which carry the load from one to the other of said members, said rollers having raceway grooves, and balls alternating with said rollers, said balls being engaged in said raceway grooves.

2. In an anti-friction bearing, the combination of an inner member having a bearing surface with means beneath said surface for engaging balls, an outer member having means for engaging balls, balls engaged in said means between said members, and alternating with said balls rollers having means for engaging therewith, said balls being rolled by said rollers and rolling independently of said members.

3. In an anti-friction bearing, the combination of members comprising a spindle having a circular raceway groove exterior thereto and a box having a circular raceway groove interior thereto and disposed in the plane of said first named groove, between said spindle and box load carrying rollers having raceway grooves in said plane, and alternating with said rollers balls registering with said raceway grooves, one of said members having an aperture registering with the groove therein and a plug for closing said aperture.

4. In an anti-friction bearing, two members one of which revolves relatively on the other, in combination with alternating spacing balls and load carrying rollers disposed between said members, said balls engaging one or more of said members and said rollers to prevent the latter from moving endwise.

5. In an anti-friction bearing, two members having concentric conical surfaces with raceway grooves therein, one of said members being revoluble relatively to the other, in combination with alternating rollers and balls disposed between said surfaces, said balls running in said grooves.

6. In an anti-friction bearing, two members having conical surfaces with circular raceway grooves therein, one of said members being revoluble relatively to the other, in combination with conical rollers having raceway grooves and balls running in said grooves between said rollers.

7. In an anti-friction bearing, a member having a conical surface with a circular raceway groove therein, a second member having a conical surface of greater pitch than said surface first named and a second groove in said second named surface, between said surfaces conical rollers having circular raceway grooves, and alternating with said rollers balls adapted to run in said grooves, said rollers having means for engaging one of said members and prevented from moving longitudinally thereby.

8. An anti-friction bearing comprising grooved inner and outer races, grooved rolls arranged between said races to sustain the load, and balls arranged between said rolls in the grooves thereof and in the grooves of the races, to separate the rolls and prevent endwise movement thereof.

In witness whereof I have hereunto set my name this 30th day of August, 1909, in the presence of the subscribing witnesses.

HENRY STUEBNER.

Witnesses:
CHARLES N. BUTLER,
CHARLES J. MCDERMOTT.

Copies of this patent may be obtained for five cents each, by addressing the "Commissioner of Patents. Washington, D. C."